(12) United States Patent
Paluri

(10) Patent No.: US 10,878,579 B2
(45) Date of Patent: *Dec. 29, 2020

(54) SYSTEMS AND METHODS FOR DETERMINING OPTICAL FLOW

(71) Applicant: Facebook, Inc., Menlo Park, CA (US)

(72) Inventor: Balamanohar Paluri, Newark, CA (US)

(73) Assignee: Facebook, Inc., Menlo Park, CA (US)

(*) Notice: Subject to any disclaimer, the term of this patent is extended or adjusted under 35 U.S.C. 154(b) by 54 days.

This patent is subject to a terminal disclaimer.

(21) Appl. No.: 16/211,104

(22) Filed: Dec. 5, 2018

(65) Prior Publication Data
US 2019/0244367 A1 Aug. 8, 2019

Related U.S. Application Data

(63) Continuation of application No. 14/980,786, filed on Dec. 28, 2015, now Pat. No. 10,181,195.

(51) Int. Cl.
G06K 9/00 (2006.01)
G06T 7/246 (2017.01)
G06K 9/46 (2006.01)
G06K 9/62 (2006.01)

(52) U.S. Cl.
CPC ............ G06T 7/246 (2017.01); G06K 9/4628 (2013.01); G06K 9/6212 (2013.01); G06K 9/6232 (2013.01); G06K 9/6259 (2013.01); G06K 9/6274 (2013.01); G06T 2207/10016 (2013.01); G06T 2207/20084 (2013.01)

(58) Field of Classification Search
CPC .. G06K 9/4628; G06K 9/6212; G06K 9/6232; G06K 9/6259; G06K 9/6274; G06T 2207/10016; G06T 2207/20084; G06T 7/246

See application file for complete search history.

(56) References Cited

U.S. PATENT DOCUMENTS

| 6,351,959 | B1 | 3/2002 | Hirota | |
|---|---|---|---|---|
| 2003/0223619 | A1 | 12/2003 | Stocker | |
| 2011/0182469 | A1* | 7/2011 | Ji | G06K 9/4628 382/103 |
| 2012/0019655 | A1* | 1/2012 | Fukamachi | G06T 7/215 348/142 |

(Continued)

OTHER PUBLICATIONS

Fischer, Philipp et al, "FlowNet: Learning Optical Flow with Convolutional Networks," arXiv:1504.06852v2, May 4, 2015.

(Continued)

Primary Examiner — Ian L Lemieux
(74) Attorney, Agent, or Firm — Sheppard Mullin Richter & Hampton LLP

(57) ABSTRACT

Systems, methods, and non-transitory computer-readable media can obtain a first video frame and a second video frame. The first video frame can be processed using a convolutional neural network to output a first set of feature maps. The second video frame can be processed using the convolutional neural network to output a second set of feature maps. The first set of feature maps and the second set of feature maps can be processed using a spatial matching layer of the convolutional neural network to determine an optical flow for at least one pixel.

20 Claims, 7 Drawing Sheets

(56) References Cited

U.S. PATENT DOCUMENTS

| | | | |
|---|---|---|---|
| 2012/0027295 A1* | 2/2012 | Shao | G06K 9/00744 382/170 |
| 2012/0154272 A1* | 6/2012 | Hildreth | A63F 13/00 345/156 |
| 2013/0279810 A1 | 10/2013 | Li | |
| 2015/0294193 A1* | 10/2015 | Tate | G06K 9/00785 382/159 |
| 2017/0132758 A1 | 5/2017 | Paluri | |
| 2017/0278289 A1* | 9/2017 | Marino | G06K 9/00765 |
| 2019/0108399 A1* | 4/2019 | Escorcia | G06K 9/00684 |
| 2019/0122373 A1* | 4/2019 | Natroshvili | G06N 3/0481 |
| 2019/0156157 A1* | 5/2019 | Saito | G06K 9/00275 |
| 2019/0197350 A1* | 6/2019 | Park | G06T 7/73 |
| 2019/0228264 A1* | 7/2019 | Huang | G06N 3/08 |
| 2019/0297326 A1* | 9/2019 | Reda | H04N 19/132 |
| 2019/0311202 A1* | 10/2019 | Lee | G06K 9/627 |
| 2019/0325595 A1* | 10/2019 | Stein | G08G 1/165 |
| 2019/0362156 A1* | 11/2019 | Muppala | G06F 9/3877 |
| 2020/0125852 A1* | 4/2020 | Carreira | G06K 9/00718 |

OTHER PUBLICATIONS

Zhou, Y.T. et al., "Computation of Optical Flow Using a Neural Network," Proceedings of IEEE International Conference on Neural Networks, pp. 2:71-78, San Diego, CA, Jul. 1998.

* cited by examiner

SYSTEMS AND METHODS FOR DETERMINING OPTICAL FLOW

CROSS-REFERENCE TO RELATED APPLICATIONS

This application is a continuation of U.S. patent application Ser. No. 14/980,786, filed on Dec. 28, 2015 and entitled "SYSTEMS AND METHODS FOR DETERMINING OPTICAL FLOW", which is incorporated herein by reference in its entirety.

FIELD OF THE INVENTION

The present technology relates to the field of determining optical flow. More particularly, the present technology relates to techniques for determining a motion of objects in images.

BACKGROUND

Today, people often utilize computing devices (or systems) for a wide variety of purposes. Users can operate their computing devices to, for example, interact with one another, create content, share information, and access information.

In some instances, computing devices can be used to determine the optical flow of pixels or objects in frames (e.g., images and/or video frames). Generally, optical flow describes the motion, or displacement, of objects in a visual scene that is captured in a frame. The motion of objects can be determined, for example, by tracking the movement of individual pixels between frames. The movement of pixels can be measured based on direction (e.g., movement along the x-axis and y-axis), and magnitude (e.g., the amount the respective pixel was displaced between the frames). Optical flow can be utilized for various purposes. In one example, an optical flow determined for frames of a video can be utilized to compress the video.

SUMMARY

Various embodiments of the present disclosure can include systems, methods, and non-transitory computer readable media configured to obtain a first video frame and a second video frame. The first video frame can be processed using a convolutional neural network to output a first set of feature maps. The second video frame can be processed using the convolutional neural network to output a second set of feature maps. The first set of feature maps and the second set of feature maps can be processed using a spatial matching layer of the convolutional neural network to determine an optical flow for at least one pixel.

In an embodiment, the systems, methods, and non-transitory computer readable media are configured to determine an optical flow for the pixel along an axis by averaging i) a first displacement measurement of the pixel across a first feature map in the first set of feature maps and a first feature map in the second set of feature maps and ii) a second displacement measurement of the pixel across a second feature map in the first set of feature maps and a second feature map in the second set of feature maps.

In an embodiment, the systems, methods, and non-transitory computer readable media are configured to determine a correspondence between at least one pixel in the first feature map in the first set and at least one pixel the first feature map in the second set, determine the first displacement measurement of the corresponding pixel between the first feature map in the first set and the first feature map in the second set along the axis, determine a correspondence between at least one pixel in the second feature map in the first set and at least one pixel the second feature map in the second set, and determine the second displacement measurement of the pixel between the second feature map in the first set and the second feature map in the second set along the axis.

In an embodiment, the systems, methods, and non-transitory computer readable media are configured to determine an optical flow for the pixel along an axis based at least in part on a histogram that includes i) a first displacement measurement of the pixel across a first feature map in the first set of feature maps and a first feature map in the second set of feature maps and ii) a second displacement measurement of the pixel across a second feature map in the first set of feature maps and a second feature map in the second set of feature maps.

In an embodiment, the systems, methods, and non-transitory computer readable media are configured to generate the histogram using the first displacement measurement and the second displacement measurement, wherein the optical flow for the pixel along the axis based at least in part on a maximum peak value in the histogram.

In an embodiment, the optical flow for the pixel provides at least a predicted direction of the pixel along an x-axis and a predicted direction of the pixel along a y-axis.

In an embodiment, the optical flow for the pixel provides at least a predicted magnitude of the pixel along an x-axis and a predicted magnitude of the pixel along a y-axis.

In an embodiment, the systems, methods, and non-transitory computer readable media are configured to train the convolutional neural network using one or more optical flow training data sets.

In an embodiment, the systems, methods, and non-transitory computer readable media configured to process a first video frame in at least one training data set using the convolutional neural network to output a first set of test feature maps, process a second video frame in the at least one training data set using the convolutional neural network to output a second set of test feature maps, process the first set of test feature maps and the second set of test feature maps using the spatial matching layer of the convolutional neural network to determine an optical flow for at least one pixel, determine at least one inaccuracy in the optical flow for the pixel based on a ground truth optical flow for the pixel, and adjust one or more weight values of one or more filters associated with the convolutional neural network to minimize the inaccuracy.

In an embodiment, the systems, methods, and non-transitory computer readable media are configured to input a representation of the first video frame to at least one convolutional layer to output a set of signals, the convolutional layer being trained to apply at least one convolutional operation to the representation of the first video frame, wherein the at least one convolutional operation is based on one or more filters to convolve the representation of the first video frame, the one or more filters being weighted to predict an optical flow for one or more pixels.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
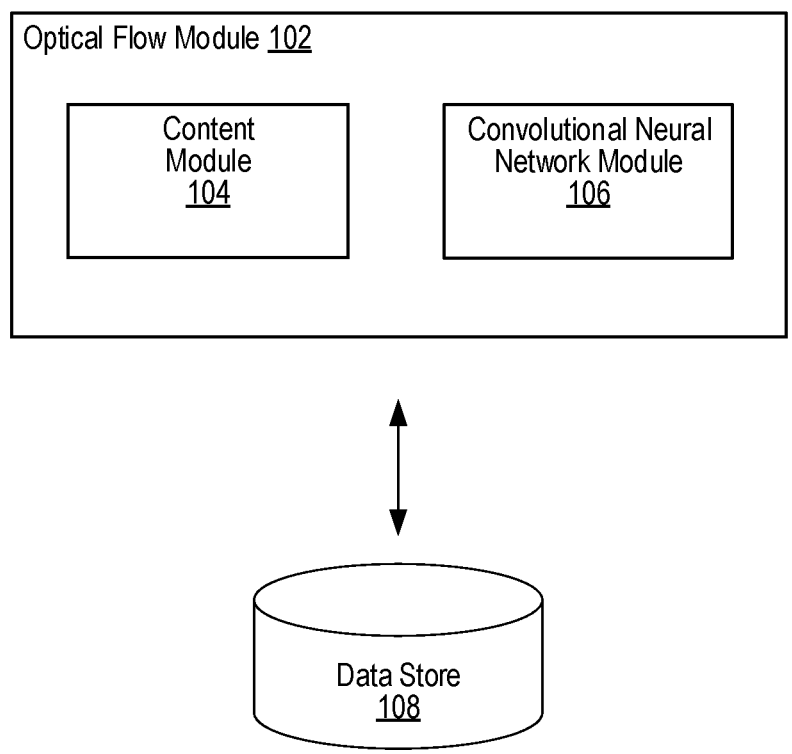
FIG. 1 illustrates an example system including an example optical flow module configured to determine optical flows for video content using one or more convolutional neural networks, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Determining Optical Flow

People use computing devices (or systems) for a wide variety of purposes. As mentioned, computing devices can be used to determine the optical flow of pixels or objects in frames (e.g., images and/or video frames). The term "object" can include any surfaces and/or edges that may be included a frame. Generally, optical flow describes the motion, or displacement, of objects in a visual scene that is captured in a frame. The motion of objects can be determined, for example, by tracking the displacement of individual pixels between frames. The displacement of pixels can be measured based on direction (e.g., movement along the x-axis, y-axis, and/or z-axis), and magnitude (e.g., the amount the respective pixel was displaced between the frames). Existing approaches for determining optical flow can provide accurate measurements, however, such approaches are typically computationally expensive. Alternatively, other existing approaches can be computationally inexpensive but will typically provide less accurate measurements of optical flow. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, frames can be provided as input to a convolutional neural network (CNN) to obtain a corresponding optical flow of pixels in the frames. The CNN can be trained using optical flow training data. Once trained, the CNN can output, for each inputted frame, a corresponding set of feature maps. In various embodiments, the set of feature maps corresponding to a first frame and the set of feature maps corresponding to a second frame can be inputted to a spatial matching layer of the CNN. The spatial matching layer can perform a pairwise analysis of feature maps from the set of feature maps for the first frame and the set of feature maps for the second frame. In doing this analysis, the spatial matching layer can determine correspondences between pixels in the two sets of feature maps and can determine respective displacements of the pixels along an x-axis and a y-axis, for example. These displacements can be evaluated using one or more techniques (e.g., histograms) to determine respective optical flows for the pixels along the x-axis and the y-axis, for example.

Optical flow can be utilized in various ways. In one example, optical flow can be utilized to recognize and categorize any actions that are captured in the frames being analyzed. For example, if the frames capture an individual jumping, then the optical flow would suggest a velocity along the y-axis. Similarly, if the frames capture an individual running, then the optical flow would suggest a velocity along the x-axis. In another example, optical flow can be extended to recognize and categorize a sport being played, as captured in the frames being analyzed. In some instances, optical flow can be utilized for surveillance purposes. For example, motion patterns, as captured in the frames being analyzed, can be evaluated using optical flow and any motion patterns that have been classified as being abnormal can be determined. In another example, the optical flow of the frames being analyzed can be utilized to perform object recognition. For example, a certain motion pattern, as determined using optical flow, can be evaluated to determine that an object captured in the frames is a particular individual or some other object (e.g., cat, bowling ball, football field, etc.).

FIG. 1 illustrates an example system 100 including an example optical flow module 102 configured to analyze video content using one or more convolutional neural networks (CNN), according to an embodiment of the present disclosure. As shown in the example of FIG. 1, the example optical flow module 102 can include a content module 104 and a convolutional neural network module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the optical flow module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the optical flow module 102 can be implemented, in part or in whole, as software running on one or more computing devices or systems, such as on a user or client computing device. In one example, the optical flow module 102 or at least a portion thereof can be implemented as or within an application (e.g., app), a program, or an applet, etc., running on a user computing device or a client computing system, such as the user device 710 of FIG. 7. In another example, the optical flow module 102 or at least a portion thereof can be implemented using one or more computing devices or systems that include one or more servers, such as network servers or cloud servers. In some instances, the optical flow module 102 can, in part or in whole, be implemented within or configured to operate in conjunction with a social networking system (or service), such as the social networking system 730 of FIG. 7.

The optical flow module 102 can be configured to communicate and/or operate with the at least one data store 108, as shown in the example system 100. The at least one data store 108 can be configured to store and maintain various types of data. In some implementations, the at least one data store 108 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. In some embodiments, the at least one data store 108 can store media content including video content, which can be obtained by the optical flow module 102. In some instances, the at least one data store 108 can also store training data for training one or more convolutional neural networks to determine optical flow. In one example, the training data can include, for example, one or more ground truth optical flow data sets that can be used to train a convolutional neural network for predicting the optical flow of a set of frames, such as respective directions and magnitudes for pixels, or voxels, corresponding to the set of frames. This training data may be real data with a known ground truth (e.g., SINTEL data set), artificial data whose ground truth has been determined using an existing optical flow technique, and/or hand labeled optical flow data sets. It should be appreciated that many variations are possible.

The content module 104 can be configured to obtain and/or receive video content to be analyzed. The video content may be a set of images or video frames, or video files, for example. In various embodiments, the video content may be provided (e.g., uploaded) by users of a social networking system and/or a content provider. In some embodiments, such video content may be stored in the data store 108 and the content module 104 can be configured to obtain the video content from the data store 108.

The convolutional neural network module 106 can be configured to analyze video content, such as video content provided by the content module 104. In various embodiments, the convolutional neural network module 106 can evaluate the video content using one or more convolutional neural networks that have each been configured to determine optical flow of pixels, or objects, between a set of frames (e.g., a frame t and a frame t+1) in the video content. More details regarding the convolutional neural network module 106 will be provided below with reference to FIG. 2.

Figure 2:
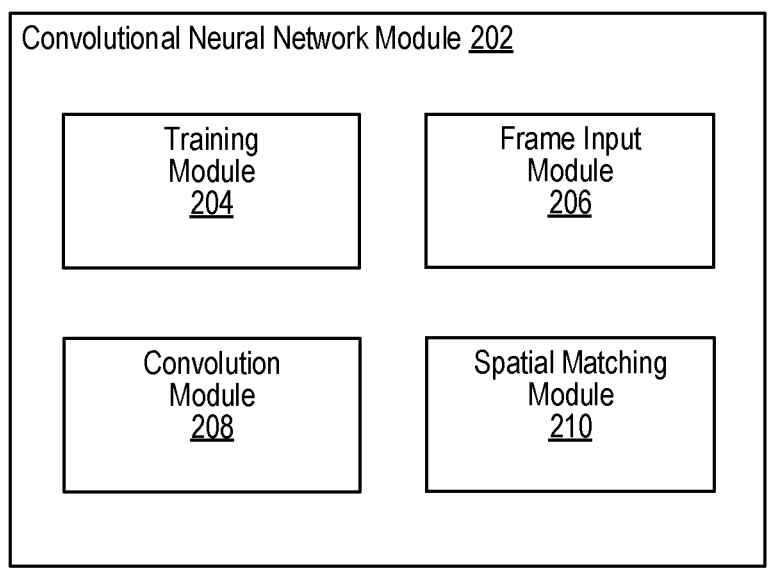
FIG. 2 illustrates an example convolutional neural network module configured to analyze video content to determine optical flow, according to an embodiment of the present disclosure.

FIG. 2 illustrates an example convolutional neural network module 202 configured to analyze video content, according to an embodiment of the present disclosure. In some embodiments, the convolutional neural network module 106 of FIG. 1 can be implemented as the example convolutional neural network module 202. As shown in FIG. 2, the example convolutional neural network module 202 can include a training module 204, a frame input module 206, a convolution module 208, and a spatial matching module 210. The convolutional neural network module 202 can evaluate a first frame and a second frame of a video using a CNN to determine optical flow between the first and second frames. In various embodiments, the CNN can include one or more convolutional layers and one or more pooling layers. A spatial matching layer that is configured to determine optical flow between the first frame and the second frame can be included in the CNN or may operate independently from the CNN, depending on the implementation. For example, the CNN can be trained to output corresponding feature maps for the first frame and the second frame. The spatial matching layer can perform various spatial matching techniques using the feature maps for the first frame and the feature maps for the second frame and output an optical flow. For example, the optical flow can indicate, for one or more pixels, a corresponding direction (e.g., along the x-axis and y-axis) and magnitude between the first and second frames. In some embodiments, pixels in the frames can be correlated to objects that are recognized in the frames. In such embodiments, the optical flow can indicate a corresponding direction and magnitude for the objects.

The training module 204 can train the CNN to output, or predict, optical flow information for a set of frames. In various embodiments, the output can be an optical flow prediction for one or more pixels, or objects, in the set of frames. The training module 204 can train the convolutional neural network to determine optical flow using ground truth training data that may be obtained, for example, from a data store (e.g., the data store 108 of FIG. 1). In some embodiments, when training the convolutional neural network to predict optical flow, the training module 204 can utilize training data that includes ground truth optical flow outputs for various video content (e.g., a direction and magnitude for each pixel).

For example, to train the various layers in the CNN, the training module 204 can process, or forward propagate, a first training frame and a second training frame through the CNN and the convolutional layers of the CNN can produce a set of corresponding feature maps for the first training frame and the second training frame. These feature maps can be utilized by a spatial matching layer to output optical flow information for the first training frame and the second training frame. This optical flow information can describe a respective direction and magnitude for one or more pixels or objects in the first and second training frames. This optical flow information can be compared against the ground truth of the first and second training frames to measure any inaccuracies in the output produced by the CNN. In various embodiments, such inaccuracies can be reduced by performing a backpropagation through the CNN. During backpropagation, the training module 204 can adjust one or more weight values of one or more filters associated with the various layers in the CNN in order to minimize the inaccuracies. By performing backpropagation over a number of training iterations, optimal, or otherwise suitable, weight values can be determined for the filters of the convolutional neural network. In various embodiments, the spatial matching layer does not have any corresponding weights. In such embodiments, during backpropagation, weight values of one or more filters associated with the convolutional layers in the CNN are adjusted.

Once trained, the frame input module 206 of the convolutional neural network module 202 can receive a set of frames for which the optical flow is to be determined. For example, the frame input module 206 can receive a first frame and a second frame. The first and second frames may, but need not, be from the same video content. Further, the first and second frames may, but need not, be frames that are consecutive in time. In various embodiments, the convolution module 208 can be configured to independently process each of the first frame and the second frame. When processing the first frame and the second frame, the convolution module 208 can be configured to apply at least one convolutional operation to the video content using one or more convolutional layers. A convolutional operation can utilize at least one filter to convolve the representation of the first frame, which can cause the representation of the first frame to be reduced in signal size. Each convolutional layer can apply a respective convolutional operation to its received input signals and can generate corresponding output signals that may be inputted into a subsequent layer during forward propagation. In some embodiments, the signals outputted from the convolutional layers are inputted to one or more subsequent convolutional layers. In some embodiments, the convolution module 208 can be configured to perform one or more pooling operations in addition to the convolutional operations. Once the various convolutional operations have been performed, the CNN can output a corresponding set of feature maps for each of the first frame and the second frame.

The spatial matching module 210 can be configured to analyze the sets of feature maps outputted by the convolution module 208 to determine an optical flow for the first and second frames. Since the first frame and the second frame were both processed using the same, or a duplicate, CNN, the respective sets of feature maps for the first and second frame will include various types of feature maps that follow the same ordering. This allows the spatial matching module 210 to compare corresponding feature maps for the first frame and the second frame. When comparing a feature map corresponding to the first frame and a feature map corresponding to the second frame, the spatial matching module 210 can determine a correspondence, or best match, for some or all pixels in the first and second frames. Various approaches can be utilized for determining such correspondences including, for example, sum of squared differences (SSD). Based on the correspondences, the spatial matching module 210 can determine a corresponding displacement measurement of how much a pixel moved along the x-axis between the first and second frames (delta x) and/or a displacement measurement of how much the pixel moved along the y-axis between the first and second frames (delta y). The spatial matching module 210 can determine such measurements for the pixel across each of the different feature maps outputted for the first and second frame. Thus, for example, if the CNN outputs 512 feature maps for the first frame and 512 feature maps for the second frame, then the spatial matching module 210 can determine a respective displacement measurement for movement of the pixel along the x-axis and the y-axis using each pair of the 512 feature maps.

In some embodiments, the spatial matching module 210 can average, for the pixel, each of the displacement measurements along the x-axis to determine the optical flow for the pixel along the x-axis. In such embodiments, the spatial matching module 210 can also average, for the pixel, each of the displacement measurements along the y-axis to determine the optical flow for the pixel along the y-axis. In some embodiments, the spatial matching module 210 can determine the optical flow along the x-axis and y-axis by generating one or more histograms. For example, the spatial matching module 210 can generate a first histogram of the different displacement measurements of a pixel along the x-axis and a second histogram of the different displacement measurements of the pixel along the y-axis. The first and second histograms can include all of the displacement measurements that were made across each of the different feature maps outputted for the first and second frame. In some embodiments, the spatial matching module 210 can use the first histogram to determine the maximum displacement measurement along the x-axis and this maximum displacement measurement can be selected as the optical flow for the pixel along the x-axis. Similarly, the spatial matching module 210 can use the second histogram to determine the maximum displacement measurement along the y-axis and this maximum displacement measurement can be selected as the optical flow for the pixel along the y-axis.

Figure 3:
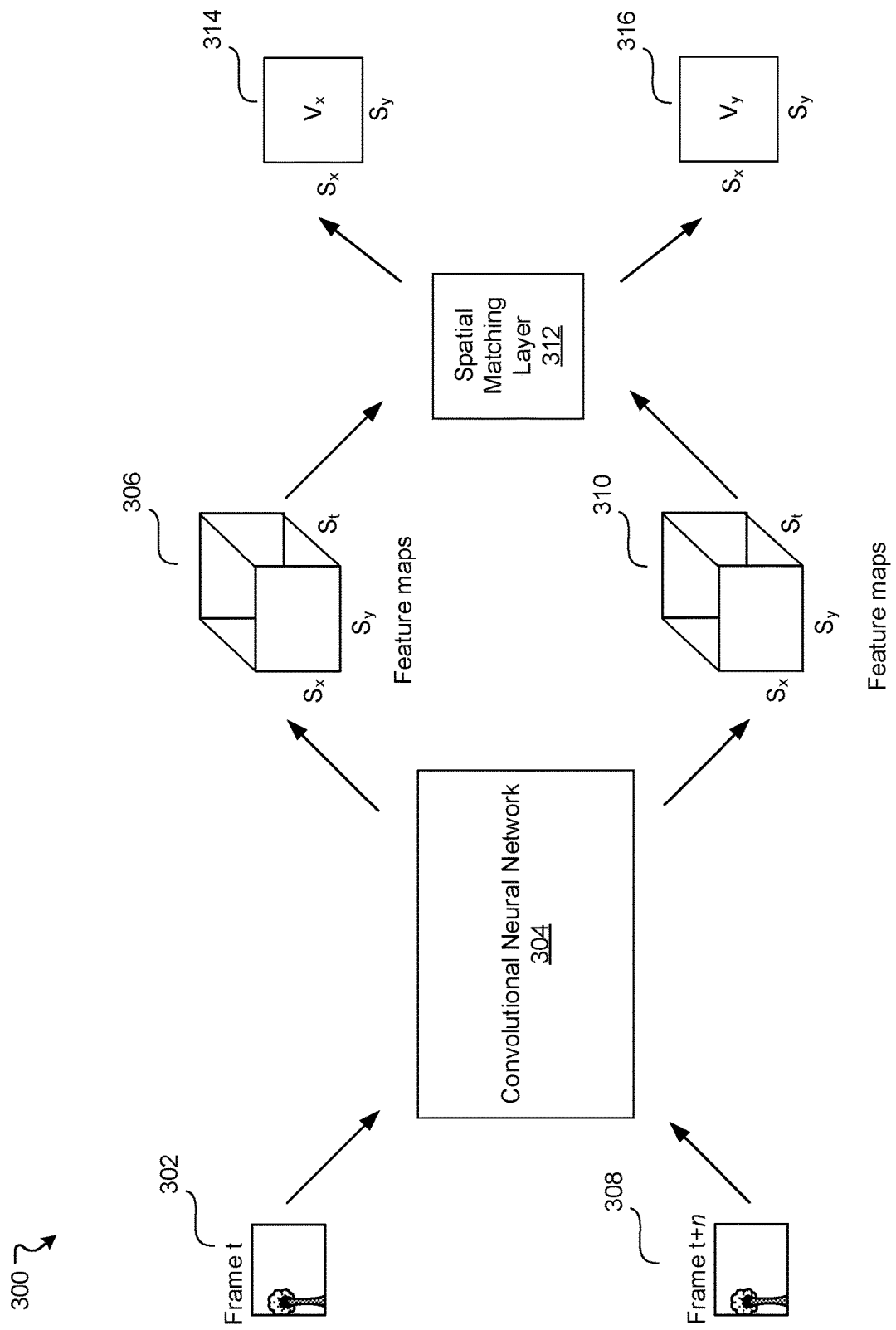
FIG. 3 illustrates an example diagram of determining optical flow using a convolutional neural network, according to an embodiment of the present disclosure.

FIG. 3 illustrates an example diagram 300 of determining optical flow using a convolutional neural network, according to an embodiment of the present disclosure. In the example of FIG. 3, a first frame 302 can be inputted to a trained convolutional neural network (CNN) 304. In this example, the CNN 304 may include a first convolutional layer having 64 filters, followed by a first pooling layer, followed by a second convolutional layer having 128 filters, followed by a second pooling layer, followed by a third convolutional layer having 512 filters. The CNN architecture can vary depending on the implementation. In this example, the first frame 302 can have a resolution of 256 pixels by 256 pixels (256×256) and can be processed through the CNN 304 to output a corresponding set of feature maps 306. In this example, the CNN 304 can output 512 feature maps for the first frame 302 and each feature map can have a resolution of 32 pixels by 32 pixels (32×32). The size and number of the feature maps can vary depending on the architecture of the CNN (e.g., the number of pooling layers and/or filters used in the CNN 304).

Similarly, a second frame 308 can be inputted to the CNN 304. In this example, the second frame 308 can have a resolution of 256 pixels by 256 pixels can be processed through the CNN 304 to output a corresponding set of feature maps 310. The CNN 304 can output 512 feature maps for the second frame 308 and each feature map can have a resolution of 32 pixels by 32 pixels. The spatial matching layer 312 can determine and output the optical flow between the first frame 302 and second frame 308, for example, along the x-axis 314 and the y-axis 316. In this example, the spatial matching layer 312 can perform a pairwise analysis using each feature map in the set of feature maps 306 corresponding to the first frame 302 and each feature map in the set of feature maps 310 corresponding to the second frame 308, as described above.

Figure 4:
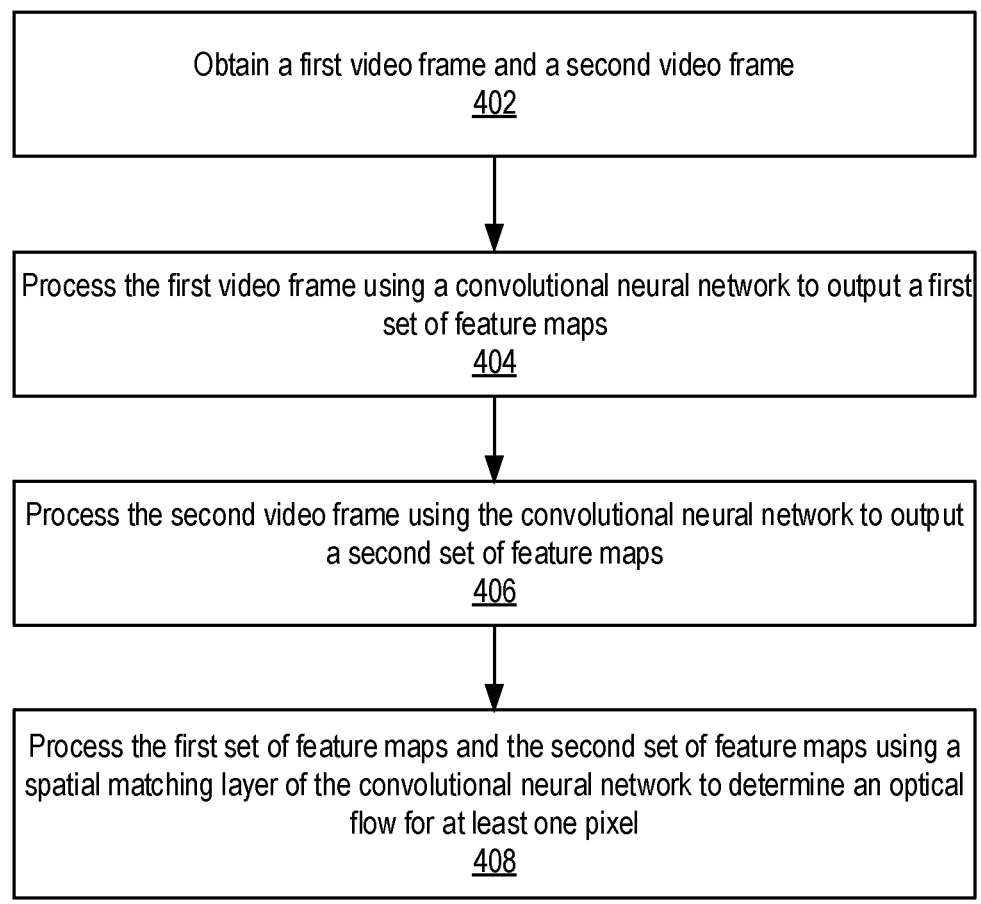
FIG. 4 illustrates an example process for determining optical flow using a convolutional neural network, according to various embodiments of the present disclosure.

FIG. 4 illustrates an example method for determining optical flow using a convolutional neural network, according to an embodiment of the present disclosure. It should be appreciated that there can be additional, fewer, or alternative steps performed in similar or alternative orders, or in parallel, within the scope of the various embodiments discussed herein unless otherwise stated. At block 402, the example method 400 can obtain a first video frame and a second video frame. At block 404, the first video frame can be processed using a convolutional neural network to output a first set of feature maps. At block 406, the second video frame can be processed using the convolutional neural network to output a second set of feature maps. At block 408, the first set of feature maps and the second set of feature maps can be processed using a spatial matching layer of the convolutional neural network to determine an optical flow for at least one pixel.

Figure 5:
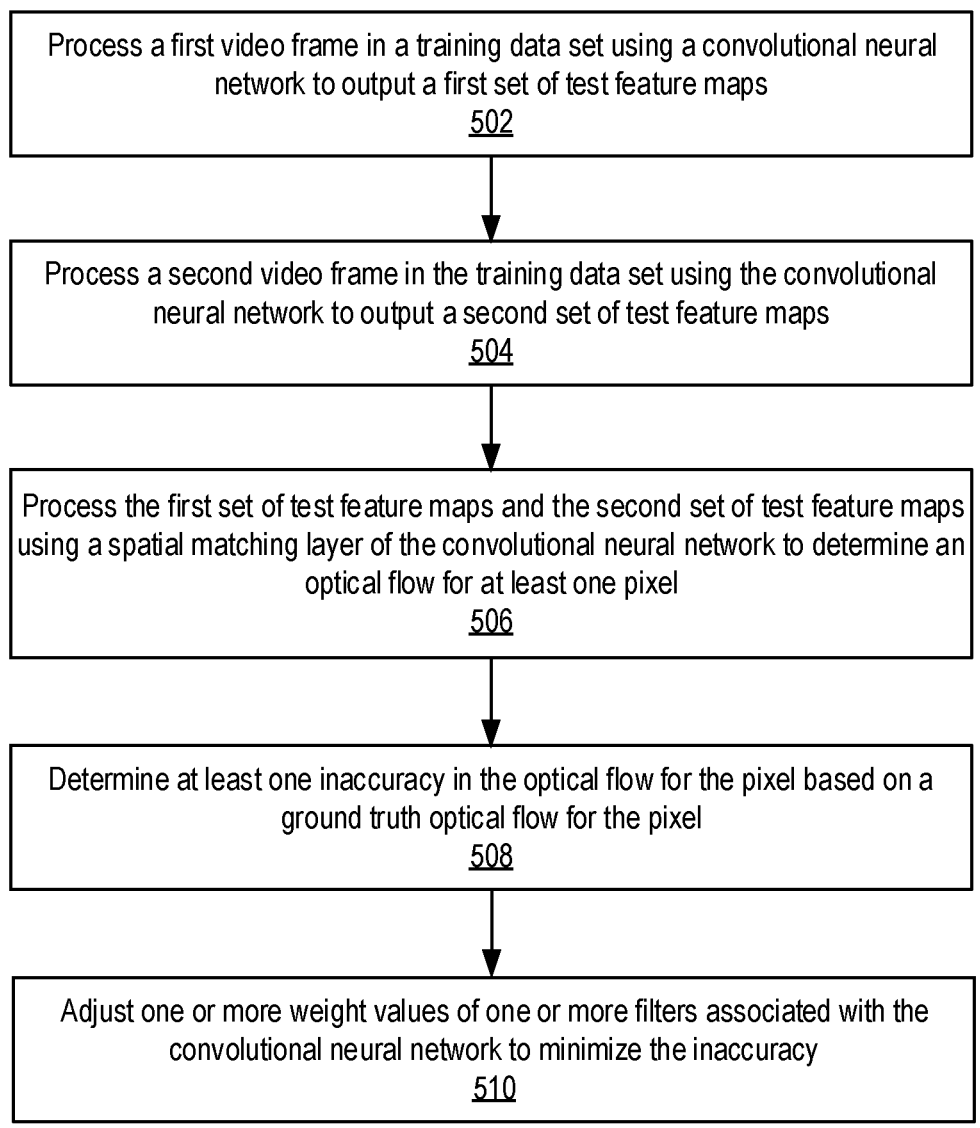
FIG. 5 illustrates an example process for training a convolutional neural network to determine optical flow, according to various embodiments of the present disclosure.

FIG. 5 illustrates an example method for training a convolutional neural network to determine optical flow, according to an embodiment of the present disclosure. It should be appreciated that there can be additional, fewer, or alternative steps performed in similar or alternative orders, or in parallel, within the scope of the various embodiments discussed herein unless otherwise stated. At block 502, the example method 500 can process a first video frame in a training data set using a convolutional neural network to output a first set of test feature maps. At block 504, the example method 500 can process a second video frame in a training data set using a convolutional neural network to output a second set of test feature maps. At block 506, the example method 500 can process the first set of test feature maps and the second set of test feature maps using a spatial matching layer of the convolutional neural network to determine an optical flow for at least one pixel. At block 508, the example method 500 can determine at least one inaccuracy in the optical flow for the pixel based on a ground truth optical flow for the pixel. At block 510, the example method 500 can adjust one or more weight values of one or more filters associated with the convolutional neural network to minimize the inaccuracy.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
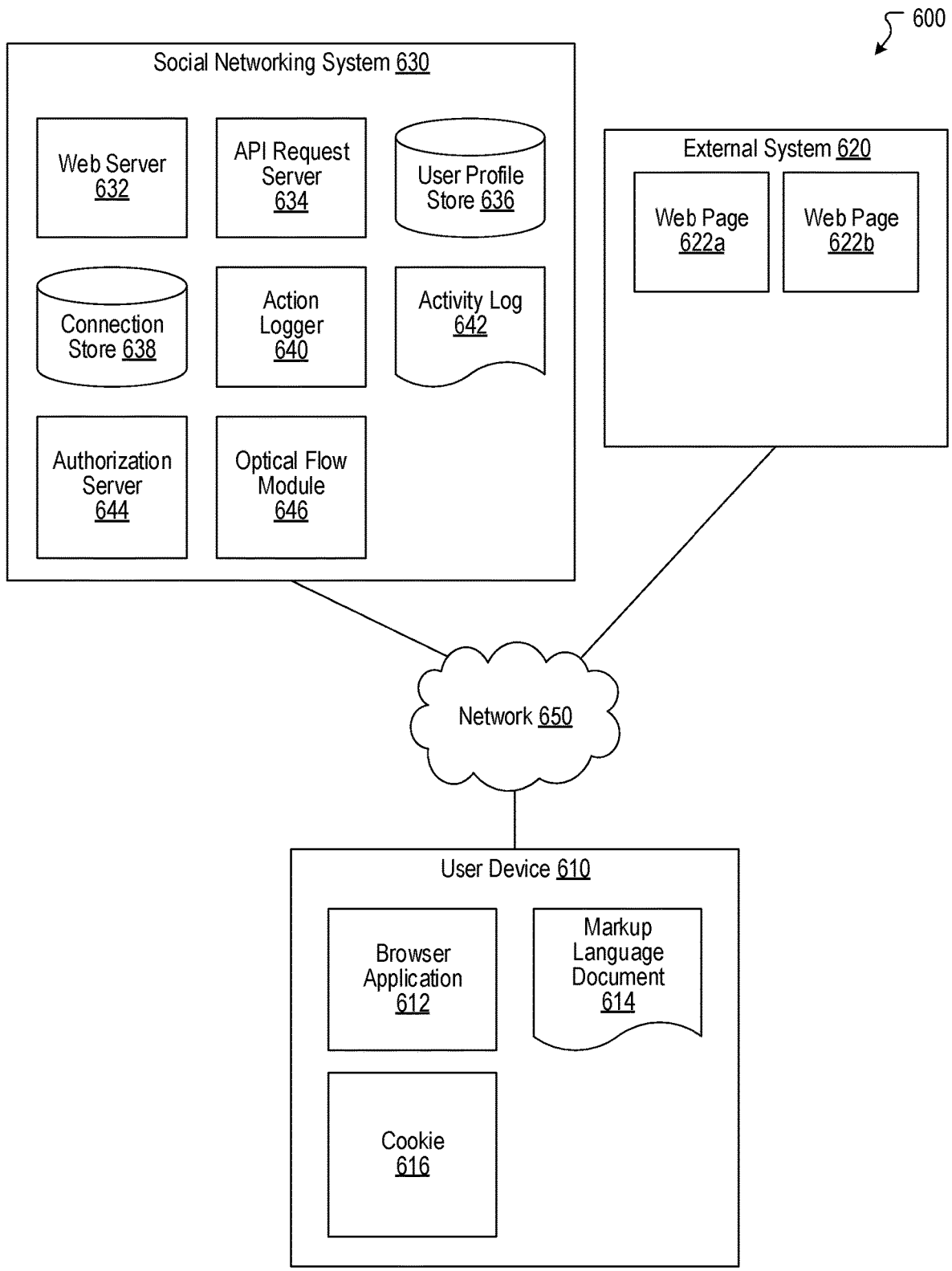
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an optical flow module 646. The optical flow module 646 can, for example, be implemented as the optical flow module 102 of FIG. 1. As discussed previously, it should be appreciated that there can be many variations or other possibilities.

Hardware Implementation

Figure 7:
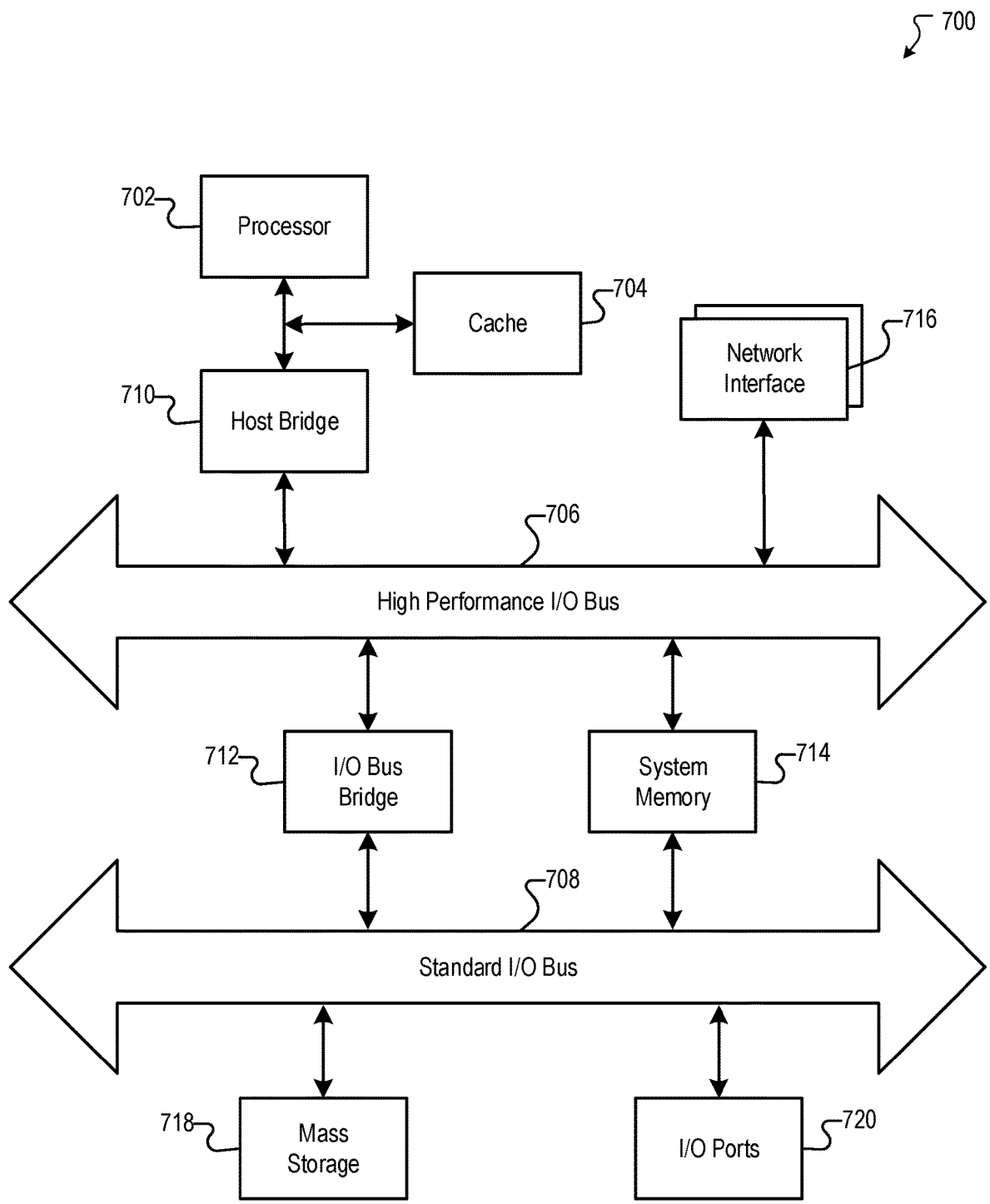
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein.

The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing system, a first video frame and a second video frame;
   processing, by the computing system, the first video frame using a convolutional neural network to output a first set of feature maps, wherein the convolutional neural network includes at least a first convolutional layer and a second convolutional layer, wherein signals outputted by the first convolutional layer are processed by a first pooling layer and then inputted to the second convolutional layer;
   processing, by the computing system, the second video frame using the convolutional neural network to output a second set of feature maps;
   processing, by the computing system, the first set of feature maps and the second set of feature maps by the convolutional neural network to determine an optical flow for at least one pixel.

2. The computer-implemented method of claim 1, further comprising:
   categorizing, by the computing system, at least one physical action represented in the first video frame and in the second video frame based at least in part on the optical flow.

3. The computer-implemented method of claim 1, further comprising:
   categorizing, by the computing system, at least one sport being played as represented in the first video frame and in the second video frame based at least in part on the optical flow.

4. The computer-implemented method of claim 1, further comprising:
   determining, by the computing system, information describing at least one object represented in the first video frame and in the second video frame based at least in part on the optical flow, the information including a corresponding direction and magnitude for the at least one object.

5. The computer-implemented method of claim 1, wherein the first set of feature maps and the second set of feature maps are processed using a spatial matching layer of the convolutional neural network.

6. The computer-implemented method of claim 5, wherein the spatial matching layer performs a pairwise analysis of the first set of feature maps and the second set of feature maps.

7. The computer-implemented method of claim 1, further comprising:
   determining, by the computing system, at least one inaccuracy in the optical flow for the pixel based on a ground truth optical flow for the pixel; and
   adjusting, by the computing system, one or more weight values of one or more filters associated with the convolutional neural network to minimize the inaccuracy.

8. The computer-implemented method of claim 1, further comprising:
   processing, by the computing system, the first set of feature maps and the second set of feature maps using a different convolutional neural network that has been trained to determine optical flow for objects to determine an optical flow for at least one object.

9. The computer-implemented method of claim 1, wherein the optical flow is determined based at least in part on an evaluation of displacement measurements corresponding to the pixel across one or more feature maps in the first set of feature maps and one or more feature maps in the second set of feature maps.

10. The computer-implemented method of claim 1, wherein the optical flow for the pixel provides at least a predicted direction or magnitude of the pixel along an x-axis and a predicted direction or magnitude of the pixel along a y-axis.

11. A system comprising:
    at least one processor; and
    a memory storing instructions that, when executed by the at least one processor, cause the system to perform:
      obtaining a first video frame and a second video frame;
      processing the first video frame using a convolutional neural network to output a first set of feature maps, wherein the convolutional neural network includes at least a first convolutional layer and a second convolutional layer, wherein signals outputted by the first convolutional layer are processed by a first pooling layer and then inputted to the second convolutional layer;
      processing the second video frame using the convolutional neural network to output a second set of feature maps;
      processing the first set of feature maps and the second set of feature maps by the convolutional neural network to determine an optical flow for at least one pixel.

12. The system of claim 11, wherein the instructions further cause the system to perform:
    categorizing at least one physical action represented in the first video frame and in the second video frame based at least in part on the optical flow.

13. The system of claim 11, wherein the instructions further cause the system to perform:
   categorizing at least one sport being played as represented in the first video frame and in the second video frame based at least in part on the optical flow.

14. The system of claim 11, wherein the instructions further cause the system to perform:
   determining information describing at least one object represented in the first video frame and in the second video frame based at least in part on the optical flow, the information including a corresponding direction and magnitude for the at least one object.

15. The system of claim 11, wherein the first set of feature maps and the second set of feature maps are processed using a spatial matching layer of the convolutional neural network.

16. A non-transitory computer-readable storage medium including instructions that, when executed by at least one processor of a computing system, cause the computing system to perform a method comprising:
   obtaining a first video frame and a second video frame;
   processing the first video frame using a convolutional neural network to output a first set of feature maps, wherein the convolutional neural network includes at least a first convolutional layer and a second convolutional layer, wherein signals outputted by the first convolutional layer are processed by a first pooling layer and then inputted to the second convolutional layer;
   processing the second video frame using the convolutional neural network to output a second set of feature maps;
   processing the first set of feature maps and the second set of feature maps by the convolutional neural network to determine an optical flow for at least one pixel.

17. The non-transitory computer-readable storage medium of claim 16, wherein the instructions further cause the computing system to perform:
   categorizing at least one physical action represented in the first video frame and in the second video frame based at least in part on the optical flow.

18. The non-transitory computer-readable storage medium of claim 16, wherein the instructions further cause the computing system to perform:
   categorizing at least one sport being played as represented in the first video frame and in the second video frame based at least in part on the optical flow.

19. The non-transitory computer-readable storage medium of claim 16, wherein the instructions further cause the computing system to perform:
   determining information describing at least one object represented in the first video frame and in the second video frame based at least in part on the optical flow, the information including a corresponding direction and magnitude for the at least one object.

20. The non-transitory computer-readable storage medium of claim 16, wherein the first set of feature maps and the second set of feature maps are processed using a spatial matching layer of the convolutional neural network.

* * * * *